United States Patent
Ohta et al.

(10) Patent No.: US 9,428,316 B2
(45) Date of Patent: *Aug. 30, 2016

(54) RESIN FOR OXYGEN-ABSORBING ADHESIVE AND OXYGEN-ABSORBING ADHESIVE

(71) Applicant: Toyo Seikan Group Holdings, Ltd., Tokyo (JP)

(72) Inventors: Yoshihiro Ohta, Yokohama-shi (JP); Yoichi Ishizaki, Yokohama (JP); Yui Asano, Yokohama (JP)

(73) Assignee: Toyo Seikan Group Holdings, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,579

(22) Filed: Jan. 12, 2015

(65) Prior Publication Data

US 2015/0125710 A1 May 7, 2015

Related U.S. Application Data

(62) Division of application No. 13/816,693, filed as application No. PCT/JP2011/068555 on Aug. 16, 2011, now abandoned.

(30) Foreign Application Priority Data

Aug. 19, 2010 (JP) .................. 2010-184026

(51) Int. Cl.
| | |
|---|---|
| C09J 167/02 | (2006.01) |
| B65D 81/26 | (2006.01) |
| C08G 63/183 | (2006.01) |
| C08G 63/54 | (2006.01) |
| C09J 167/06 | (2006.01) |
| B01J 20/26 | (2006.01) |
| B32B 15/09 | (2006.01) |
| B32B 7/12 | (2006.01) |

(52) U.S. Cl.
CPC ............ B65D 81/266 (2013.01); B01J 20/264 (2013.01); B32B 7/12 (2013.01); B32B 15/09 (2013.01); C08G 63/183 (2013.01); C08G 63/54 (2013.01); C09J 167/02 (2013.01); C09J 167/06 (2013.01); B32B 2255/06 (2013.01); B32B 2255/26 (2013.01); B32B 2307/74 (2013.01); Y10T 428/31794 (2015.04)

(58) Field of Classification Search
CPC .... C08G 63/183; C08G 63/54; C09J 167/02; C09J 167/06; B65D 81/266; Y10T 428/31794
USPC .................. 528/302, 303, 304, 306
See application file for complete search history.

(56) References Cited

U.S. PATENT DOCUMENTS

| | | | |
|---|---|---|---|
| 4,786,749 A | 11/1988 | Koleske et al. | |
| 7,696,300 B2 | 4/2010 | Ohta et al. | |
| 7,842,361 B2 | 11/2010 | Ohta et al. | |
| 7,910,185 B2 | 3/2011 | Ishizaki et al. | |
| 8,673,173 B2 | 3/2014 | Ishizaki et al. | |
| 9,102,853 B2 * | 8/2015 | Ohta et al. ......... | C08G 18/4213 |
| 2007/0036923 A1 | 2/2007 | Ishizaki et al. | |
| 2008/0227912 A1 | 9/2008 | Ohta et al. | |
| 2009/0098323 A1 | 4/2009 | Ohta et al. | |
| 2010/0087619 A1 | 4/2010 | Ohta et al. | |
| 2012/0001121 A1 | 1/2012 | Ishizaki et al. | |

FOREIGN PATENT DOCUMENTS

| | | |
|---|---|---|
| CN | 1950424 A | 4/2007 |
| CN | 101466761 A | 6/2009 |
| EP | 1749847 A1 | 2/2007 |
| EP | 2404948 A1 | 1/2012 |
| JP | 61007352 A | 1/1986 |
| JP | 62265249 A | 11/1987 |
| JP | 3259917 A | 11/1991 |
| JP | 4328155 A | 11/1992 |
| JP | 7292340 A | 11/1995 |
| JP | 2006131699 A | 5/2006 |
| JP | 2007302874 A | 11/2007 |
| JP | 2008007739 A | 1/2008 |
| JP | 2011144281 A | 7/2011 |
| JP | 2011184482 A | 9/2011 |
| KR | 10-2008-0068087 | 7/2008 |
| WO | WO-2005105887 A1 | 11/2005 |
| WO | WO-2006080500 A1 | 8/2006 |
| WO | WO-2010/029977 A1 | 3/2010 |
| WO | WO-2010/0101290 A1 | 9/2010 |
| WO | WO-2010/101290 A1 | 9/2010 |

OTHER PUBLICATIONS

Extended European Search Report in EP Application No. 11818196.5 dated Sep. 14, 2015, 5 pages.
International Search Report for PCT/JP2011/068555 dated Nov. 29, 2011.
Office Action in KR Application No. 031313158 dated May 7, 2014.

* cited by examiner

Primary Examiner — Ling Choi
Assistant Examiner — Gennadiy Mesh
(74) Attorney, Agent, or Firm — Marshall, Gerstein & Borun LLP

(57) ABSTRACT

A two-component curable oxygen-absorbing composition comprises a polyester comprising structural units derived from an acid component (A) and an acid component (B), wherein the ratio of the acid component (A) to total acid components is 70 mol % to 95 mol %, the ratio of the acid component (B) to total acid components is 0 mol % to 15 mol %, the polyester has a glass transition temperature of −20° C. to 0° C., the resin is cured using a diisocyanate hardening agent, and the acid component (A) is a tetrahydrophthalic acid or a derivative thereof, or a tetrahydrophthalic acid anhydride or a derivative thereof, and the acid component (B) is a phthalic acid or an analog thereof.

9 Claims, No Drawings

RESIN FOR OXYGEN-ABSORBING ADHESIVE AND OXYGEN-ABSORBING ADHESIVE

CROSS-REFERENCE TO RELATED APPLICATIONS

This is a division of U.S. patent application Ser. No. 13/816,693 filed Feb. 12, 2013, which is the U.S national phase of PCT/JP2011/068555 filed Aug. 16, 2011 which claims the Convention priority of JP 2010-184026 filed Aug. 19, 2010, the respective entire disclosures of which are incorporated herein by reference.

TECHNICAL FIELD

The present invention relates to a resin for an oxygen-absorbing adhesive and an oxygen-absorbing adhesive which are excellent in adhesion, cohesive force, and oxygen-absorbing property.

BACKGROUND ART

For improvement in content storage performances, various gas-barrier packaging materials have been proposed. In particular, oxygen-absorbing packaging containers obtained by using materials having oxygen-absorbing performances for packaging containers have attracted attention recently. A method in which an oxygen-absorbing resin composition is used as a paint or an adhesive for coating has been proposed as a method for achieving an oxygen-absorbing packaging container.

Patent Literature 1 proposes an oxygen-absorbing adhesive obtained by blending an inorganic oxide having oxygen-absorbing property with a polyol. However, the oxygen-absorbing adhesive has the following problems and the like. Specifically, the oxygen-absorbing adhesive is opaque, and poor in oxygen-absorbing performance. In addition, the oxygen-absorbing adhesive cannot be used in a dry atmosphere, because the expression of the oxygen-absorbing performance requires water. Meanwhile, paints and adhesives using various oxygen-absorbing resins have been proposed (for example, Patent Literatures 2 and 3). However, there is no case where oxygen-absorbing property, adhesion, and cohesive force are all achieved.

CITATION LIST

Patent Literatures

Patent Literature 1: Japanese Patent Application Publication No. 2006-131699
Patent Literature 2: International Publication No. WO 2006/080500
Patent Literature 3: Japanese Patent Application Publication No. 2008-7739

SUMMARY OF INVENTION

Technical Problem

Accordingly, an object of the present invention is to provide a two-part curable oxygen-absorbing resin composition having all of oxygen-absorbing property, adhesion, and cohesive force.

Solution to Problem

The present invention provides a resin for an oxygen-absorbing adhesive, wherein
the resin is a polyester comprising structural units derived from an acid component (A) and an acid component (B),
the ratio of the acid component (A) is 70% to 95% by mole relative to all acid components,
the ratio of the acid component (B) is 0% to 15% by mole relative to the all acid components,
the glass transition temperature of the polyester is −20° C. to 2° C., and
the resin is intended to be used after being cured with a curing agent:
the acid component (A): a tetrahydrophthalic acid, a derivative thereof, a tetrahydrophthalic anhydride, or a derivative thereof, and
the acid component (B): a phthalic acid or an analog of the phthalic acid.

Moreover, the present invention provides a two-part curable oxygen-absorbing resin composition comprising:
a main agent comprising the resin for an oxygen-absorbing adhesive; and
curing agent component.

Moreover, the present invention provides an oxygen-absorbing adhesive comprising the two-part curable oxygen-absorbing resin composition.

Further, the present invention provides an oxygen-absorbing laminated film comprising at least:
an oxygen barrier film layer;
an oxygen-absorbing layer made of the oxygen-absorbing adhesive; and
a sealant film layer.

Advantageous Effect of Invention

A flexible packaging material having excellent oxygen removal performance can be easily produced at low costs by using the two-part curable oxygen-absorbing resin composition of the present invention as an adhesive for a multilayer packaging material, for example, as an alternative to a conventional adhesive for dry lamination. This oxygen-absorbing flexible packaging material makes it possible to keep for long periods the qualities of foods, pharmaceuticals, electronic components, and the like which are sensitive to oxygen.

DESCRIPTION OF EMBODIMENTS

A resin for an oxygen-absorbing adhesive of the present invention is a polyester comprising structural units derived from an acid component (A) and an acid component (B).

In the resin for an oxygen-absorbing adhesive of the present invention, the acid component (A) is a tetrahydrophthalic acid, a derivative thereof, a tetrahydrophthalic anhydride, or a derivative thereof. The acid component (A) is preferably a methyltetrahydrophthalic acid, a derivative thereof, a methyltetrahydrophthalic anhydride, or a derivative thereof. Here, the term "derivative" includes esters, acid halides, substituted compounds, oligomers, and the like.

Moreover, in the resin for an oxygen-absorbing adhesive of the present invention, the acid component (A) is preferably as follows: the acid component (A) contains 50 to 100% by mole and more preferably 60 to 100% by mole of an acid component having a structure selected from the group consisting of (i) and (ii):
(i) a dicarboxylic acid or dicarboxylic anhydride having a carbon atom which is bonded to both groups having the following structures (a) and (b) and also which is bonded to one or two hydrogen atoms, the carbon atom being included in an alicyclic structure:
  (a) a carbon-carbon double bond group,
  (b) a hetero atom-containing functional group or a linking group derived from the functional group; and
  (ii) a dicarboxylic acid or dicarboxylic anhydride in which a carbon atom adjacent to a carbon-carbon double bond in an unsaturated alicyclic structure is bonded to an electron-donating substituent and a hydrogen atom,
  another carbon atom adjacent to the carbon atom is bonded to a hetero atom-containing functional group or a linking group derived from the functional group, and
  the electron-donating substituent and the hetero atom-containing functional group or the linking group derived from the functional group are in a cis configuration.

Each of the above-described structures (i) and (ii) is a molecular structure having particularly excellent reactivity with oxygen because of the substituent effect. Preferred are acid components in which the hetero atom-containing functional group or the linking group derived from the functional group in the above-described structure (i) or (ii) is the dicarboxylic acid or the dicarboxylic anhydride in a tetrahydrophthalic acid or tetrahydrophthalic anhydride structure.

Examples of the acid component having the structure (i) include $\Delta^2$-tetrahydrophthalic acid derivatives, $\Delta^3$-tetrahydrophthalic acid derivatives, $\Delta^2$-tetrahydrophthalic anhydride derivatives, and $\Delta^3$-tetrahydrophthalic anhydride derivatives. The acid component having the structure of (i) is preferably a $\Delta^3$-tetrahydrophthalic acid derivative or a $\Delta^3$-tetrahydrophthalic anhydride derivative, and particularly preferably 4-methyl-$\Delta^3$-tetrahydrophthalic acid or 4-methyl-$\Delta^3$-tetrahydrophthalic anhydride.

4-Methyl-$\Delta^3$-tetrahydrophthalic anhydride can be obtained by, for example, structural isomerization of an isomer mixture containing 4-methyl-$\Delta^4$-tetrahydrophthalic anhydride obtained by a reaction of a $C_5$ fraction of naphtha mainly containing isoprene with maleic anhydride, and has been produced industrially.

The acid component having the structure (ii) is particularly preferably cis-3-methyl-$\Delta^4$-tetrahydrophthalic acid or cis-3-methyl-$\Delta^4$-tetrahydrophthalic anhydride. cis-3-Methyl-$\Delta^4$-tetrahydrophthalic anhydride can be obtained by, for example, a reaction of a $C_5$ fraction of naphtha mainly containing trans-piperylene with maleic anhydride, and has been produced industrially.

Moreover, exo-3,6-epoxy-1,2,3,6-tetrahydrophthalic anhydride is an example of acid components in which the hetero atom-containing functional group or the linking group derived from the functional group in the above-described structure (i) or (ii) is not the dicarboxylic acid or the dicarboxylic anhydride in the tetrahydrophthalic acid or tetrahydrophthalic anhydride structure.

There are many compounds which can be shown as examples of the tetrahydrophthalic acid, the derivative thereof, the tetrahydrophthalic anhydride, or the derivative thereof. In particular, acid components having the above-described structure (i) and acid components having the above-described structure (ii) are each preferably used as a raw material of the resin for an oxygen-absorbing adhesive of the present invention, because of extremely high reactivity with oxygen. One kind of these acid components having the structure (i) or the structure (ii) may be used alone. It is also preferable to use two or more kinds thereof in combination. A mixture of 4-methyl-$\Delta^3$-tetrahydrophthalic anhydride, which is preferred as the acid component having the structure of (i), and cis-3-methyl-$\Delta^4$-tetrahydrophthalic anhydride, which is preferred as the acid component having the structure (ii), can be easily obtained as an industrial product at low costs by structural isomerization of a mixture of cis-3-methyl-$\Delta^4$-tetrahydrophthalic anhydride and 4-methyl-$\Delta^4$-tetrahydrophthalic anhydride obtained by a reaction of a $C_5$ fraction of naphtha mainly containing trans-piperylene and isoprene with maleic anhydride. In view of industrial application, it is particularly preferable to use such an inexpensive isomer mixture as a raw material of the resin for an oxygen-absorbing adhesive of the present invention.

In a case where an oxygen-absorbing polyester, which is the resin for an oxygen-absorbing adhesive of the present invention, is polymerized by using a tetrahydrophthalic acid, a derivative thereof, a tetrahydrophthalic anhydride, or a derivative thereof as a raw material, the dicarboxylic acid or the dicarboxylic anhydride may be esterified into a methyl ester or the like.

Moreover, in order to accelerate the oxygen-absorbing reaction, an oxygen-absorbing reaction catalyst (an oxidation catalyst) may be added to the resin for an oxygen-absorbing adhesive of the present invention obtainable by polymerization of a raw material containing a tetrahydrophthalic acid, a derivative thereof, a tetrahydrophthalic anhydride, or a derivative thereof. However, since the resin for an oxygen-absorbing adhesive of the present invention obtainable by polymerization of a raw material containing an acid component having the above-described structure (i) or an acid component having the above-described structure (ii) has an extremely high reactivity with oxygen, the resin for an oxygen-absorbing adhesive of the present invention can exhibit a practical oxygen-absorbing performance even in the absence of the oxygen-absorbing reaction catalyst. In addition, in order to prevent formation of a gel and the like due to excessive deterioration of the resin caused by the oxygen-absorbing reaction catalyst when an adhesive is prepared by using the resin for an oxygen-absorbing adhesive of the present invention or when a process is carried out by using the adhesive, it is desirable not to contain a catalytic amount of an oxygen-absorbing reaction catalyst. Here, examples of the oxygen-absorbing reaction catalyst include transition metal salts made of organic acids and transition metals such as manganese, iron, cobalt, nickel, and copper. Moreover, the phrase "not to contain a catalytic amount of an oxygen-absorbing reaction catalyst" means that the oxygen-absorbing reaction catalyst is generally less than 10 ppm, and preferably less than 1 ppm in terms of the amount of the transition metal.

In the resin for an oxygen-absorbing adhesive of the present invention, the acid component (B) is a phthalic acid or an analog of the phthalic acid. Examples of the phthalic acid or analog thereof being the acid component (B) include o-phthalic acid, isophthalic acid, terephthalic acid, sulfoisophthalic acid, 5-sulfoisophthalic acid sodium salt, derivatives thereof, and the like. Here, the derivatives include esters, acid anhydrides, acid halides, substituted compounds, oligomers, and the like. Of these phthalic acids, isophthalic acid or terephthalic acid is particularly preferable. Terephthalic acid is preferable, because copolymerization with terephthalic acid improves the cohesive force of the resin itself, and improves the adhesion strength of an adhesive, so that the delamination can be prevented. Moreover, isophthalic acid is preferable, because copolymerization with isophthalic acid improves solubility in a solvent, while maintaining the cohesive force.

The ratio of the acid component (A) is 70% to 95% by mole, preferably 75% to 95% by mole, and more preferably 80% to 95% by mole, relative to all acid components. Meanwhile, the ratio of the acid component (B) is 0% to 15% by mole, preferably 0% to 12.5% by mole, and more preferably 0% to 10% by mole, relative to the all acid components. Such a composition ratio makes it possible to obtain a resin for an oxygen-absorbing adhesive which is excellent in oxygen-absorbing performance and adhesion, and is excellent in solubility in an organic solvent.

The glass transition temperature of the resin for an oxygen-absorbing adhesive of the present invention is −20° C. to 2° C. (for example, −20° C. to 0° C.), preferably in the range from −15° C. to 2° C., and more preferably in the range from −12° C. to 2° C., in order to obtain sufficient oxygen-absorbing performance. If the glass transition temperature exceeds the above-described range, the mobility of the molecular chains is remarkably lowered after curing, so that the oxygen-absorbing performance deteriorates. If the glass transition temperature is below the above-described range, the mobility is so high that inactivation reactions such as disproportionation and recombination of radicals required to initiate an auto-oxidation reaction tend to occur. Consequently, there arises a possibility that the oxygen-absorbing performance remarkably deteriorates especially at an initial stage. Therefore, such a glass transition temperature is not preferable, when the resin for an oxygen-absorbing adhesive of the present invention is used in an adhesive.

The resin for an oxygen-absorbing adhesive of the present invention further comprises a structural unit derived from a diol component. Examples of the diol component include ethylene glycol, diethylene glycol, triethylene glycol, polyethylene glycol, propylene glycol, dipropylene glycol, polypropylene glycol, trimethylene glycol, 1,3-butanediol, 1,4-butanediol, 3-methyl-1,5-pentanediol, 1,6-hexanediol, 1,7-heptanediol, 1,8-octanediol, 1,9-nonanediol, neopentyl glycol, 1,4-cyclohexanedimethanol, 2-phenylpropanediol, 2-(4-hydroxyphenyl)ethyl alcohol, α,α-dihydroxy-1,3-diisopropylbenzene, o-xylene glycol, m-xylene glycol, p-xylene glycol, α,α-dihydroxy-1,4-diisopropylbenzene, hydroquinone, 4,4-dihydroxydiphenyl, naphthalenediol, derivatives thereof, and the like. Preferred are aliphatic diols including, for example, ethylene glycol, diethylene glycol, triethylene glycol, 1,4-butanediol, 1,6-hexanediol, and neopentyl glycol, and further preferred is 1,4-butanediol. When 1,4-butanediol is used, the oxygen-absorbing performance of the resin is high, and further the amount of degradation products generated during the auto-oxidation is small. One kind of these diol components can be used alone, or two or more kinds thereof can be used in combination.

The resin for an oxygen-absorbing adhesive of the present invention may further comprise a structural unit derived from an aromatic dicarboxylic acid other than phthalic acid, an aliphatic dicarboxylic acid, an aliphatic hydroxycarboxylic acid, a polyvalent alcohol, a polyvalent carboxylic acid, a derivative thereof, or the like. Here, the term "derivative" includes esters, acid anhydrides, acid halides, substituted compounds, oligomers, and the like. Of these, an aliphatic dicarboxylic acid is particularly preferable. One kind thereof can be used alone, or two or more kind thereof can be used in combination. The glass transition temperature of the obtained resin for an oxygen-absorbing adhesive can be controlled easily by copolymerization with the above-described further acid component, and the oxygen-absorbing performance can be improved. Further, it is also possible to control solubility in an organic solvent. Moreover, the viscosity characteristics of an oxygen-absorbing adhesive composition dissolved in a solvent can be modified by introducing a polyvalent alcohol and a polyvalent carboxylic acid and thus controlling the branching structure of the resin.

Examples of the aromatic dicarboxylic acid other than the phthalic acid and the derivative thereof include naphthalenedicarboxylic acids such as 2,6-naphthalenedicarboxylic acid, anthracenedicarboxylic acids, derivatives thereof, and the like.

Examples of the aliphatic dicarboxylic acid and the derivative thereof include oxalic acid, malonic acid, succinic acid, succinic anhydride, glutaric acid, adipic acid, pimelic acid, suberic acid, azelaic acid, sebacic acid, undecanedioic acid, dodecanedioic acid, 3,3-dimethylpentanedioic acid, derivatives thereof, and the like. Of these examples, adipic acid, succinic acid, and succinic anhydride are preferable, and succinic acid and succinic anhydride are particularly preferable.

Examples of the aliphatic hydroxycarboxylic acid and the derivative thereof include glycolic acid, lactic acid, hydroxypivalic acid, hydroxycaproic acid, hydroxyhexanoic acid, and derivatives thereof.

Examples of the polyvalent alcohol and the derivative thereof include 1,2,3-propanetriol, sorbitol, 1,3,5-pentanetriol, 1,5,8-heptanetriol, trimethylolpropane, pentaerythritol, 3,5-dihydroxybenzyl alcohol, glycerin, and derivatives thereof.

Examples of the polyvalent carboxylic acid and the derivative thereof include 1,2,3-propanetricarboxylic acid, meso-butane-1,2,3,4-tetracarboxylic acid, citric acid, trimellitic acid, pyromellitic acid, and derivatives thereof.

The ratio of the structural unit derived from the further acid component is preferably 1% to 30% by mole, and more preferably 5% to 20% by mole, relative to the all acid components.

In addition, when a component having three or more functional groups such as a polyvalent alcohol or a polyvalent carboxylic acid is copolymerized, the ratio of the structural unit derived from the component is preferably within 5% by mole relative to the all acid components.

The resin for an oxygen-absorbing adhesive of the present invention can be obtained by any polyester polycondensation method known to those skilled in the art. For example, the method may be interfacial polycondensation, solution polycondensation, melt polycondensation, or solid-state polycondensation.

A polymerization catalyst is not necessarily required for the synthesis of the resin for an oxygen-absorbing adhesive of the present invention. However, it is possible to use, for example, an ordinary polyester polymerization catalyst such as a titanium-based, germanium-based, antimony-based, tin-based, or aluminum-based polyester polymerization catalyst. Alternatively, it is also possible to use a known polymerization catalyst such as a nitrogen-containing basic compound, boric acid, a boric acid ester, or an organic sulfonic acid-based compound.

Further, it is also possible to add various additives including an anti-coloring agent, an antioxidant, and the like, such as a phosphorus compound, for the polymerization. The addition of an antioxidant makes it possible to reduce oxygen absorption during the polymerization or subsequent processing, so that deterioration in performance of the resin for an oxygen-absorbing adhesive and the formation of a gel can be prevented.

The number average molecular weight of the resin for an oxygen-absorbing adhesive of the present invention is preferably 500 to 100000, and more preferably 1000 to 20000. Meanwhile, a preferred weight average molecular weight is 5000 to 200000, more preferably 10000 to 100000, and further preferably 20000 to 90000. If the molecular weights are below the above-described ranges, the cohesive force, i.e., creep resistance of the resin deteriorates. If the molecular weights exceed the above-described ranges, deterioration in coatability occurs because of decrease in solubility in an organic solvent or increase in solution viscosity. Hence, such molecular weights are not preferable, when the resin for an oxygen-absorbing adhesive of the present invention is used in an adhesive. When the molecular weights are within the above-described ranges, it is possible to obtain an oxygen-absorbing adhesive resin composition which is excellent in cohesive force, adhesion, and solubility in an organic solvent, and which has viscosity characteristics preferable as those of an adhesive solution.

Moreover, it is also possible to obtain a resin for an oxygen-absorbing adhesive of the present invention with a higher molecular weight by using a chain extender such as an organic diisocyanate. Various known aromatic, aliphatic, or alicyclic diisocyanates can be used as the organic diisocyanate-based chain extender. Examples of the aromatic diisocyanates include 4,4'-diphenylmethane diisocyanate, tolylene diisocyanate, and the like. Examples of the aliphatic diisocyanates include hexamethylene diisocyanate, xylylene diisocyanate, lysine diisocyanate, and the like. Examples of the alicyclic diisocyanates include cyclohexane-1,4-diisocyanate, isophorone diisocyanate, dicyclohexylmethane-4,4'-diisocyanate, dimer diisocyanate obtained by converting the carboxyl groups of dimer acid into isocyanate groups, and the like. Further, these organic diisocyanates can also be used in the form of a tri- or higher functional polyisocyanate compound such as an adduct with trimethylolpropane or the like, an isocyanurate compound, or a biuret compound. One kind of the above-described organic isocyanates and polyisocyanate compounds may be used alone, or two or more kinds thereof may be used in combination.

One kind of resins for an oxygen-absorbing adhesive of the present invention may be used alone, or two or more kinds thereof may be used in combination.

The resin for an oxygen-absorbing adhesive of the present invention is used with a curing agent as a two-part curable oxygen-absorbing resin composition. A compound capable of curing the resin by a reaction with functional groups of the oxygen-absorbing polyester, such as carboxyl groups or hydroxy groups, is preferably used as the curing agent. Examples thereof include isocyanate-based, epoxy-based, melamine-based, amine-based, carbodiimide-based, oxazoline-based, aziridine-based, organic titanium-based, and organic silane-based curing agents, and the like. In this case, it is preferable to use a compound having three or more reactive functional groups as the curing agent, because the cohesive force is improved by a cross-linking reaction. Moreover, one kind of these curing agents may be used alone, or two or more kinds thereof may be used in combination.

It is particularly preferable to prepare a urethane-based adhesive by using an isocyanate-based curing agent, among the above-described curing agents, because the adhesion strength and the cohesive force are increased, and the urethane-based adhesive is curable at a low temperature around room temperature. Any of the organic diisocyanates and polyisocyanate compounds listed as the chain extender can be used preferably as the isocyanate-based curing agent. In particular, an aliphatic diisocyanate such as hexamethylene diisocyanate or xylylene diisocyanate or an alicyclic diisocyanate such as isophorone diisocyanate is preferable, and it is preferable to use the organic diisocyanate in the form of a three- or higher functional polyisocyanate compound such as an adduct with trimethylolpropane or the like, an isocyanurate compound, or a biuret compound.

Examples of the epoxy-based curing agent include polypropylene glycol diglycidyl ether, polyethylene glycol diglycidyl ether, glycerol polyglycidyl ether, trimethylolpropane polyglycidyl ether, neopentyl glycol diglycidyl ether, sorbitol polyglycidyl ether, sorbitan polyglycidyl ether, polyglycerol polyglycidyl ether, pentaerythritol polyglycidyl ether, 1,6-hexanediol diglycidyl ether, 3,4-epoxycyclohexenylmethyl-3',4'-epoxycyclohexenecarboxylate, and the like.

Regarding the organic titanium-based curing agent, the valence of the titanium is not limited, and a tetraalkoxytitanium containing tetravalent titanium or a derivative thereof is particularly preferable. Examples of the organic titanium-based curing agent include titanium alkoxides such as titanium tetramethoxide, titanium tetraethoxide, titanium tetraisopropoxide, titanium tetra-n-butoxide, titanium tetra-2-ethylhexoxide, titanium tetrastearoxide, trimethoxytitanium chloride, triethoxytitanium chloride, ethyltrimethoxytitanium, methyltriethoxytitanium, ethyltriethoxytitanium, diethyldiethoxytitanium, phenyltrimethoxytitanium, and phenyltriethoxytitanium, as well as titanium alkoxide derivatives such as polymers thereof; titanium chelates such as diisopropoxytitanium bis(acetylacetonate), titanium tetraacetylacetonate, diisopropoxytitanium bis(octyleneglycolate), dioctyloxytitanium bis(octyleneglycolate), diisopropoxytitanium bis(ethyl acetate), diisopropoxytitanium bis(triethanolaminate), di-n-butoxytitanium bis(triethanolaminate), titanium lactate, and dihydroxytitanium bislactate, as well as derivatives thereof; and titanium acylates such as hydroxytitanium stearate, tri-n-butoxytitanium stearate, and isopropoxytitanium tristearate, as well as derivatives thereof such as polymers thereof. However, the organic titanium-based curing agent is not limited to these examples. In addition, of these organic titanium-based curing agents, particularly preferred are titanium alkoxides and derivative thereof, as well as titanium chelates, and further preferred are titanium tetra-n-butoxide polymers with a degree of polymerization of 4 to 10 and diisopropoxytitanium bis(acetylacetonate).

The resin for an oxygen-absorbing adhesive of the present invention can be dissolved in a solvent such as an organic solvent, and used as an oxygen-absorbing adhesive resin composition. Examples of the solvent include ethyl acetate, acetone, methyl ethyl ketone, methyl isobutyl ketone, toluene, xylene, isopropanol, and the like. In particular, ethyl acetate is generally used as a solvent of an adhesive for dry lamination of flexible packaging, because ethyl acetate causes relatively few odor troubles due to residual solvent. Hence, a single solvent of ethyl acetate not containing toluene, xylene, or the like is preferably used as the solvent of the present invention, in view of industrial application.

If necessary, various additives such as a silane coupling agent, an antioxidant, an ultraviolet absorber, an anti-hydrolysis agent, a fungicide, a curing catalyst, a thickener, a plasticizer, a pigment, a filler, a polyester resin, and an epoxy resin can be added to the two-part curable oxygen-absorbing resin composition of the present invention, unless the object of the present invention is adversely affected.

The two-part curable oxygen-absorbing resin composition of the present invention can be used for the purpose of laminating multiple films, as in the case of ordinary adhesives for dry lamination. In particular, the two-part curable oxygen-absorbing resin composition of the present invention can be suitably used for laminating a film substrate having oxygen barrier property and a sealant film having heat sealing property and oxygen gas permeability. In this case, the structure of the laminate includes an oxygen barrier substrate layer/a two-part curable oxygen-absorbing resin composition layer/a sealant layer, from the outer layer side. This structure is preferable because oxygen permeating and penetrating from the outside can be blocked by the oxygen barrier substrate, so that deterioration in oxygen-absorbing performance of the two-part curable oxygen-absorbing resin composition due to oxygen outside a container can be prevented, and because the two-part curable oxygen-absorbing resin composition can rapidly absorb oxygen inside the container through the oxygen permeable sealant film.

Each of the film substrate and the sealant film having oxygen barrier property may be constituted of a single layer or a laminate. As the film substrate having oxygen barrier property, it is preferable to use a biaxially oriented PET film, biaxially oriented polyamide film, or biaxially oriented polypropylene film having, as a barrier layer, a vapor-deposited thin film of a metal or a metal oxide such as silica or alumina, or a barrier coating layer mainly composed of a gas-barrier organic material such as a polyvinyl alcohol-based resin, an ethylene-vinyl alcohol copolymer, a polyacrylic acid-based resin, or a vinylidene chloride-based resin, or the like. Moreover, an ethylene-vinyl alcohol copolymer film, a poly(meta-xylylene adipamide) film, a polyvinylidene chloride-based film, or a metal foil such as an aluminum foil is also preferable. It is possible to use a laminate of substrates of a single kind or substrates of two or more different kinds of these film substrates having oxygen barrier property. In addition, it is also preferable to use the film substrate having oxygen barrier property after a biaxially oriented PET film, a biaxially oriented polyamide film, a biaxially oriented polypropylene film, cellophane, paper, or the like is laminated on the film substrate.

Examples of the material of the sealant film include low-density polyethylene, medium-density polyethylene, high-density polyethylene, linear low-density polyethylene, linear ultra-low-density polyethylene, polypropylene, poly-1-butene, poly-4-methyl-1-pentene, cyclic olefin polymers, cyclic olefin copolymers, polyolefins including random or block copolymers of α-olefins such as ethylene, propylene, 1-butene, and 4-methyl-1-pentene and the like, ethylene-vinyl acetate copolymers, ethylene-(meth)acrylic acid copolymers, ionically cross-linked products (ionomers) thereof, ethylene-vinyl compound copolymers such as ethylene-methyl methacrylate copolymers, polyesters having heat sealing property such as PET, A-PET, PETG, and PBT, amorphous nylon, and the like. A blend of two kinds or more of these materials can also be used, or a laminate of a single material or different materials thereof may be used.

A known dry laminator can be used to laminate multiple film substrates by using the two-part curable oxygen-absorbing resin composition of the present invention. With this dry laminator, it is possible to carry out a series of laminating processes including application of the two-part curable oxygen-absorbing resin composition onto a barrier film substrate, solvent vaporization with a drying oven, and lamination with a sealant film by nip rolls heated at 50 to 120° C. The amount of the two-part curable oxygen-absorbing resin composition applied is 0.1 g/m$^2$ to 30 g/m$^2$, preferably 1 g/m$^2$ to 15 g/m$^2$, and further preferably 2 g/m$^2$ to 10 g/m$^2$. It is preferable to age an oxygen-absorbing laminated film laminated by using the two-part curable oxygen-absorbing resin composition at a temperature around room temperature, for example, at 10° C. to 60° C., in order to promote the curing reaction. The curing is caused by crystallization of the resin for an oxygen-absorbing adhesive and cross-linking reaction with the curing agent such as an organic diisocyanate, and is preferable because the curing results in improvement in adhesion strength and cohesive force.

Note that the aging is preferably conducted in the absence of oxygen or under blocking of oxygen by tightly sealing the oxygen-absorbing laminated film with, for example, an oxygen-impermeable bag or the like. Thus, deterioration in oxygen-absorbing performance due to oxygen in the air can be prevented during the aging.

Moreover, the resin for an oxygen-absorbing adhesive of the present invention can also be used as a solventless adhesive, without being dissolved in a solvent. In this case, the oxygen-absorbing laminated film can be obtained by using a known non-solvent laminator.

Further, the resin for an oxygen-absorbing adhesive of the present invention can be used not only in adhesive applications, but also in paint applications, and can be applied as coating films for various films and the like.

An oxygen-absorbing laminated film laminated by using the resin for an oxygen-absorbing adhesive of the present invention can be suitably used for bag-shaped containers with various shapes and lid members for cup or tray containers. Examples of the bag-shaped containers include three-side or four-side sealed flat pouches, pouches with gusset, standing pouches, pillow packaging bags, and the like.

An oxygen-absorbing container in which the oxygen-absorbing laminated film is used in at least a part of the oxygen-absorbing container effectively blocks oxygen permeating from the outside of the container, and absorbs oxygen remaining in the container. For this reason, such an oxygen-absorbing container is useful as a container which improves the shelf-life by keeping the oxygen concentration in the container at a low level for a long period, and thus preventing deterioration in quality of a content due to oxygen.

In particular, examples of contents susceptible to deterioration in the presence of oxygen include foods such as coffee beans, tea leaves, snacks, rice confectionery products, raw or semi-raw confectionery products, fruits, nuts, vegetables, fish or meat products, paste products, dried fish, smoked foods, Tsukudani (Japanese simmered foods), raw rice, cooked rice food products, infant foods, jams, mayonnaise, ketchup, edible oils, dressings, sources, and dairy products; beverages such as beers, wines, fruit juices, green teas, and coffees; and other contents such as pharmaceuticals, cosmetics, electronic components; and the like. However, the contents are not limited to these examples.

EXAMPLES

Hereinafter, the present invention is described more specifically on the basis of Examples. Values were measured by the following methods.
(1) Number Average Molecular Weight (Mn) and Weight Average Molecular Weight (Mw)
Measurement was conducted by gel permeation chromatography (GPC, an HLC-8120 model GPC manufactured by Tosoh Corporation) in terms of polystyrene. Chloroform was used as the solvent.
(2) Composition Ratio of Monomer Units in Resin for Oxygen-Absorbing Adhesive
By nuclear magnetic resonance spectroscopy (1H-NMR, EX270 manufactured by JEOL DATUM Ltd.), the composition ratio of acid components in a resin was calculated from the area ratio of signals of benzene ring protons (8.1 ppm) derived from terephthalic acid, benzene ring protons (8.7 ppm) derived from isophthalic acid, methylene protons (2.6 ppm) derived from succinic acid, methylene protons (2.3 ppm) derived from adipic acid, methylene protons (4.3 to 4.4 ppm) adjacent to ester groups derived from terephthalic acid and isophthalic acid, and methylene protons (4.1 to 4.2 ppm) adjacent to ester groups derived from methyltetrahydrophthalic anhydride, succinic acid, adipic acid, and sebacic acid. Deuterated chloroform containing tetramethylsilane as a reference substance was used as the solvent.

Here, the composition ratio of acid components in each resin was almost equivalent to the feed amounts (molar ratio) of monomers used for polymerization.

(3) Glass Transition Temperature; Tg

Measurement was conducted by using a differential scanning calorimeter (DSC6220 manufactured by Seiko Instruments Inc.) under a nitrogen stream at a rate of temperature rise of 10° C./minute.

(4) Amount of Oxygen Absorbed

A test piece of 2 cm×10 cm cut from a laminated film was placed in an oxygen impermeable steel foil laminate cup with an internal volume of 85 cm$^3$, tightly sealed with an aluminum foil laminate film lid by heat sealing, and was stored under an atmosphere of 22° C. The oxygen concentration in the cup after a 14-day storage was measured with a micro gas chromatograph (M200 manufactured by Agilent Technologies, Inc.), and the amount of oxygen absorbed per square centimeter of the film was calculated. An oxygen-absorbing performance with 0.015 ml/cm$^2$ or more in a 7-day period and 0.025 ml/cm$^2$ or more in a 14-day period was evaluated as good (G).

(5) Creep Resistance

A T-peel creep test between aluminum foil and LDPE was conducted under an atmosphere of 40° C. with a test piece width of 25 mm and a load of 50 g, and an peel length (unit: mm) was measured 2 hours later. A test piece with 20 mm or more was evaluated as poor (P), and a test piece with less than 20 mm was evaluated as good (G).

(6) Overall Evaluation

A case where both the oxygen-absorbing performance and the creep resistance were evaluated as G was evaluated as good (G), and a case where either or both of the oxygen-absorbing performance and the creep resistance were evaluated as P was evaluated as poor (P).

Example 1

Into a 3-L separable flask equipped with a stirrer, a nitrogen inlet, and a Dean-Stark water separator, 399 g of a methyltetrahydrophthalic anhydride isomer mixture (HN-2200 manufactured by Hitachi Chemical Co., Ltd.) containing 45% by mole of 4-methyl-$\Delta^3$-tetrahydrophthalic anhydride and 21% by mole of cis-3-methyl-$\Delta^4$-tetrahydrophthalic anhydride as the acid component (A), 50 g of terephthalic acid (manufactured by Wako Pure Chemical Industries, Ltd.) as the acid component (B), 30 g of succinic anhydride (manufactured by Wako Pure Chemical Industries, Ltd.) as the further acid component, 379 g of 1,4-butanediol (manufactured by manufactured by Wako Pure Chemical Industries, Ltd.) as the diol component, 300 ppm of isopropyl titanate (manufactured by KISHIDA CHEMICAL Co., Ltd.) as the polymerization catalyst, and 20 ml of toluene were introduced. Then, a reaction was allowed to proceed for approximately 6 hours in a nitrogen atmosphere at 150° C. to 200° C., while the produced water was being removed. Subsequently, toluene was removed from the reaction system, and then polymerization was conducted under a reduced pressure of 0.1 kPa at 200 to 220° C. for approximately 3 hours. Thus, a resin for an oxygen-absorbing adhesive was obtained. Here, the Mn was approximately 4400, the Mw was 57200, and the Tg was −2.2° C.

The obtained resin for an oxygen-absorbing adhesive was dissolved in ethyl acetate at a concentration of 20% by weight (hereinafter, this solution is referred to as Base Solution A). Curing Agent A (CAT-RT1 manufactured by Toyo-Morton, Ltd., an alicyclic isocyanate-based curing agent with a solid content concentration of 70%) in an amount of 10 phr (parts per hundred resin) in terms of solid content was mixed with this Base Solution A, and the mixture was shaken. Thus, an oxygen-absorbing adhesive solution was prepared. The prepared adhesive solution was applied with a #18 bar coater onto an aluminum foil surface of a laminated film including a biaxially oriented PET film (film thickness: 12 μm)/an aluminum foil (film thickness: 7 μm) and being prepared by a dry lamination method. The solvent contained in the adhesive was evaporated with hot air of a hair dryer, and then the laminated film was passed between hot rolls at 70° C., with the surface of the laminated film on which the adhesive was applied and a corona-treated surface of a 30-μm LDPE film (AJ-3 manufactured by TAMAPOLY CO., LTD.) being faced to each other. Thus, an oxygen-absorbing laminated film was obtained which was constituted of the biaxially oriented PET film (film thickness: 12 μm)/the aluminum foil (film thickness: 7 μm)/the oxygen-absorbing resin composition (adhesive) (film thickness: 4 μm)/the LDPE.

The obtained oxygen-absorbing laminated film was stored at 35° C. under a nitrogen atmosphere for 5 days, and then subjected to the evaluation of the amount of oxygen absorbed and the evaluation of the creep resistance. Table 1 shows the results.

Example 2

An oxygen-absorbing adhesive solution was prepared by mixing Curing Agent A in an amount of 20 phr in terms of solid content with Base Solution A, followed by shaking. An oxygen-absorbing film was prepared by using the prepared adhesive solution in the same manner as in Example 1, and then subjected to the evaluations after storage. Table 1 shows the results.

Example 3

An oxygen-absorbing adhesive solution was prepared by mixing Curing Agent B (A-50 manufactured by Mitsui Chemicals, Inc., an alicyclic and aliphatic mixture isocyanate-based curing agent with a solid content concentration of 75%) in an amount of 10 phr in terms of solid content with Base Solution A, followed by shaking. An oxygen-absorbing film was prepared by using the prepared adhesive solution in the same manner as in Example 1, and then subjected to the evaluations after storage. Table 1 shows the results.

Example 4

A resin for a oxygen-absorbing adhesive was obtained by conducting polymerization for approximately 3 hours in the same manner as in Example 1, except that 399 g of a methyltetrahydrophthalic anhydride isomer mixture (HN-2200 manufactured by Hitachi Chemical Co., Ltd.) was used as the acid component (A), 25 g of terephthalic acid (manufactured by Wako Pure Chemical Industries, Ltd.) was used as the acid component (B), 45 g of succinic anhydride (Wako Pure Chemical Industries, Ltd.) was used as the further acid component, 379 g of 1,4-butanediol (manufactured by Wako Pure Chemical Industries, Ltd.) was used as the diol component, 300 ppm of isopropyl titanate (manufactured by KISHIDA CHEMICAL Co., Ltd.) was used as the polymerization catalyst, and 20 ml of toluene was used. Here, the Mn was approximately 4600, the Mw was 56900, and the Tg was −5.3° C.

The obtained resin for an oxygen-absorbing adhesive was dissolved in ethyl acetate at a concentration of 20% by weight (hereinafter, this solution is referred to as Base Solution B). An oxygen-absorbing adhesive solution was prepared by mixing Curing Agent A in an amount of 10 phr in terms of solid content with this Base Solution B, followed by shaking. An oxygen-absorbing film was prepared by using the prepared adhesive solution in the same manner as in Example 1, and then subjected to the evaluations after storage. Table 1 shows the results.

Example 5

An oxygen-absorbing adhesive solution was prepared by mixing Curing Agent A in an amount of 20 phr in terms of solid content with Base Solution B, followed by shaking. An oxygen-absorbing film was prepared by using the prepared adhesive solution in the same manner as in Example 1, and then subjected to the evaluations after storage. Table 1 shows the results.

Example 6

An oxygen-absorbing adhesive solution was prepared by mixing Curing Agent B in an amount of 10 phr in terms of solid content with Base Solution B, followed by shaking. An oxygen-absorbing film was prepared by using the prepared adhesive solution in the same manner as in Example 1, and then was subjected to the evaluations after storage. Table 1 shows the results.

Example 7

A resin for an oxygen-absorbing adhesive was obtained by conducting polymerization for approximately 3 hours in the same manner as in Example 1, except that 399 g of a methyltetrahydrophthalic anhydride isomer mixture (HN-2200 manufactured by Hitachi Chemical Co., Ltd.) was used as the acid component (A), 60 g of succinic anhydride (manufactured by Wako Pure Chemical Industries, Ltd.) was used as the further acid component, 379 g of 1,4-butanediol (manufactured by Wako Pure Chemical Industries, Ltd.) was used as the diol component, 300 ppm of isopropyl titanate (manufactured by KISHIDA CHEMICAL Co., Ltd.) was used as the polymerization catalyst, and 20 ml of toluene was used. Here, the Mn was approximately 3800, the Mw was 57800, and the Tg was −8.5° C.

The obtained resin for an oxygen-absorbing adhesive was dissolved in ethyl acetate at a concentration of 20% by weight (hereinafter, this solution is referred to as Base Solution C). An oxygen-absorbing adhesive solution was prepared by mixing Curing Agent A in an amount of 10 phr in terms of solid content with this Base Solution C, followed by shaking. An oxygen-absorbing film was prepared by using the prepared adhesive solution in the same manner as in Example 1, and then subjected to the evaluations after storage. Table 1 shows the results.

Example 8

An oxygen-absorbing adhesive solution was prepared by mixing Curing Agent A in an amount of 20 phr in terms of solid content with Base Solution C, followed by shaking. An oxygen-absorbing film was prepared by using the prepared adhesive solution in the same manner as in Example 1, and then subjected to the evaluations after storage. Table 1 shows the results.

Example 9

An oxygen-absorbing adhesive solution was prepared by mixing Curing Agent B in an amount of 10 phr in terms of solid content with Base Solution C, followed by shaking. An oxygen-absorbing film was prepared by using the prepared adhesive solution in the same manner as in Example 1, and then subjected to the evaluations after storage. Table 1 shows the results.

Example 10

A resin for an oxygen-absorbing adhesive was obtained by conducting polymerization for approximately 3 hours in the same manner as in Example 1, except that 399 g of a methyltetrahydrophthalic anhydride isomer mixture (HN-2200 manufactured by Hitachi Chemical Co., Ltd.) was used as the acid component (A), 50 g of isophthalic acid (manufactured by Wako Pure Chemical Industries, Ltd.) was used as the acid component (B), 30 g of succinic anhydride (manufactured by Wako Pure Chemical Industries, Ltd.) was used as the further acid component, 379 g of 1,4-butanediol (manufactured by Wako Pure Chemical Industries, Ltd.) was used as the diol component, 300 ppm of isopropyl titanate (manufactured by KISHIDA CHEMICAL Co., Ltd.) was used as the polymerization catalyst, and 20 ml of toluene was used. Here, the Mn was approximately 4100, the Mw was 41900, and the Tg was −2.9° C.

The obtained resin for an oxygen-absorbing adhesive was dissolved in ethyl acetate at a concentration of 20% by weight (hereinafter, this solution is referred to as Base Solution D). An oxygen-absorbing adhesive solution was prepared by mixing Curing Agent A in an amount of 10 phr in terms of solid content with this Base Solution D, followed by shaking. An oxygen-absorbing film was prepared by using the prepared adhesive solution in the same manner as in Example 1, and then subjected to the evaluations after storage. Table 1 shows the results.

Example 11

A resin for an oxygen-absorbing adhesive was obtained by conducting polymerization for approximately 3 hours in the same manner as in Example 1, except that 399 g of a methyltetrahydrophthalic anhydride isomer mixture (HN-2200 manufactured by Hitachi Chemical Co., Ltd.) was used as the acid component (A), 50 g of terephthalic acid (manufactured by Wako Pure Chemical Industries, Ltd.) was used as the acid component (B), 44 g of adipic acid (manufactured by Wako Pure Chemical Industries, Ltd.) was used as the further acid component, 379 g of 1,4-butanediol (manufactured by Wako Pure Chemical Industries, Ltd.) was used as the diol component, 300 ppm of isopropyl titanate (manufactured by KISHIDA CHEMICAL Co., Ltd.) was used as the polymerization catalyst, and 20 ml of toluene was used. Here, the Mn was approximately 4600, the Mw was 53200, and the Tg was −6.5° C.

The obtained resin for an oxygen-absorbing adhesive was dissolved in ethyl acetate at a concentration of 20% by weight (hereinafter, this solution is referred to as Base Solution E). An oxygen-absorbing adhesive solution was prepared by mixing Curing Agent A in an amount of 10 phr in terms of solid content with this Base Solution E, followed by shaking. An oxygen-absorbing film was prepared by using the prepared adhesive solution in the same manner as in Example 1, and then subjected to the evaluations after storage. Table 1 shows the results.

Example 12

A resin for an oxygen-absorbing adhesive was obtained by conducting polymerization for approximately 3 hours in the same manner as in Example 1, except that 449 g of a methyltetrahydrophthalic anhydride isomer mixture (HN-2200 manufactured by Hitachi Chemical Co., Ltd.) was used as the acid component (A), 25 g of terephthalic acid (manufactured by Wako Pure Chemical Industries, Ltd.) was used as the acid component (B), 15 g of succinic anhydride (manufactured by Wako Pure Chemical Industries, Ltd.) was used as the further acid component, 379 g of 1,4-butanediol (manufactured by Wako Pure Chemical Industries, Ltd.) was used as the diol component, 300 ppm of isopropyl titanate (manufactured by KISHIDA CHEMICAL Co., Ltd.) was used as the polymerization catalyst, and 20 ml of toluene was used. Here, the Mn was approximately 4000, the Mw was 51900, and the Tg was −1.5° C.

The obtained resin for an oxygen-absorbing adhesive was dissolved in ethyl acetate at a concentration of 20% by weight (hereinafter, this solution is referred to as Base Solution F). An oxygen-absorbing adhesive solution was prepared by mixing Curing Agent A in an amount of 10 phr in terms of solid content with this Base Solution F, followed by shaking. An oxygen-absorbing film was prepared by using the prepared adhesive solution in the same manner as in Example 1, and then subjected to the evaluations after storage. Table 1 shows the results.

Example 13

A resin for an oxygen-absorbing adhesive was obtained by conducting polymerization for approximately 3 hours in the same manner as in Example 1, except that 449 g of a methyltetrahydrophthalic anhydride isomer mixture (HN-2200 manufactured by Hitachi Chemical Co., Ltd.) was used as the acid component (A), 30 g of succinic anhydride (manufactured by Wako Pure Chemical Industries, Ltd.) was used as the further acid component, 351 g of 1,4-butanediol (manufactured by Wako Pure Chemical Industries, Ltd.) was used as the diol component, 300 ppm of isopropyl titanate (manufactured by KISHIDA CHEMICAL Co., Ltd.) was used as the polymerization catalyst, and 20 ml of toluene was used. Here, the Mn was approximately 3700, the Mw was 56800, and the Tg was −4.2° C.

The obtained resin for an oxygen-absorbing adhesive was dissolved in ethyl acetate at a concentration of 20% by weight (hereinafter, this solution is referred to as Base Solution G). An oxygen-absorbing adhesive solution was prepared by mixing Curing Agent A in an amount of 10 phr in terms of solid content with this Base Solution G, followed by shaking. An oxygen-absorbing film was prepared by using the prepared adhesive solution in the same manner as in Example 1, and then subjected to the evaluations after storage. Table 1 shows the results.

Example 14

An oxygen-absorbing adhesive solution was prepared by mixing Curing Agent B in an amount of 10 phr in terms of solid content with Base Solution G, followed by shaking. An oxygen-absorbing film was prepared by using the prepared adhesive solution in the same manner as in Example 1, and then subjected to the evaluations after storage. Table 1 shows the results.

Example 15

A resin for an oxygen-absorbing adhesive was obtained by conducting polymerization for approximately 2 hours in the same manner as in Example 1, except that 449 g of a methyltetrahydrophthalic anhydride isomer mixture (HN-2200 manufactured by Hitachi Chemical Co., Ltd.) was used as the acid component (A), 50 g of terephthalic acid (manufactured by Wako Pure Chemical Industries, Ltd.) was used as the acid component (B), 379 g of 1,4-butanediol (manufactured by Wako Pure Chemical Industries, Ltd.) was used as the diol component, 300 ppm of isopropyl titanate (manufactured by KISHIDA CHEMICAL Co., Ltd.) was used as the polymerization catalyst, and 20 ml of toluene was used. Here, the Mn was approximately 3500, the Mw was 24400, and the Tg was 0.2° C.

The obtained resin for an oxygen-absorbing adhesive was dissolved in ethyl acetate at a concentration of 20% by weight (hereinafter, this solution is referred to as Base Solution H). An oxygen-absorbing adhesive solution was prepared by mixing Curing Agent A in an amount of 10 phr in terms of solid content with this Base Solution H, followed by shaking. An oxygen-absorbing film was prepared by using the prepared adhesive solution in the same manner as in Example 1, and then subjected to the evaluations after storage. Table 1 shows the results.

Example 16

A resin for an oxygen-absorbing adhesive was obtained by conducting polymerization for approximately 2 hours in the same manner as in Example 1, except that 349 g of a methyltetrahydrophthalic anhydride isomer mixture (HN-2200 of Hitachi Chemical Co., Ltd.) was used as the acid component (A), 75 g of terephthalic acid (Wako Pure Chemical Industries, Ltd.) was used as the acid component (B), 45 g of succinic anhydride (Wako Pure Chemical Industries, Ltd.) was used as the further acid component, 379 g of 1,4-butanediol (Wako Pure Chemical Industries, Ltd.) was used as the diol component, 300 ppm of isopropyl titanate (KISHIDA CHEMICAL Co., Ltd.) was used as the polymerization catalyst, and 20 ml of toluene was used. Here, the Mn was approximately 4900, the Mw was 50300, and the Tg was −3.8° C.

The obtained resin for an oxygen-absorbing adhesive was dissolved in ethyl acetate at a concentration of 20% by weight (hereinafter, this solution is referred to as Base Solution J). An oxygen-absorbing adhesive solution was prepared by mixing Curing Agent A in an amount of 10 phr in terms of solid content with this Base Solution J, followed by shaking. An oxygen-absorbing film was prepared by using the prepared adhesive solution in the same manner as in Example 1, and then subjected to the evaluations after storage. Table 1 shows the results.

Comparative Example 1

A resin for an oxygen-absorbing adhesive was obtained by conducting polymerization for approximately 2 hours in the same manner as in Example 1, except that 349 g of a methyltetrahydrophthalic anhydride isomer mixture (HN-2200 manufactured by Hitachi Chemical Co., Ltd.) was used as the acid component (A), 150 g of terephthalic acid (manufactured by Wako Pure Chemical Industries, Ltd.) was used as the acid component (B), 487 g of 1,4-butanediol (manufactured by Wako Pure Chemical Industries, Ltd.) was used as the diol component, 300 ppm of isopropyl titanate (manufactured by KISHIDA CHEMICAL Co., Ltd.) was used as the polymerization catalyst, and 20 ml of toluene was used. Here, the Mn was approximately 4800, the Mw was 47500, and the Tg was 5.7° C.

The obtained resin for an oxygen-absorbing adhesive was dissolved in ethyl acetate at a concentration of 20% by weight (hereinafter, this solution is referred to as Base Solution K). An oxygen-absorbing film was prepared in the same manner as in Example 1, except that no curing agent was added to this Base Solution K. The oxygen-absorbing film was then subjected to the evaluations after storage. Table 1 shows the results.

Comparative Example 2

A resin for an oxygen-absorbing adhesive was obtained by conducting polymerization for approximately 2 hours in the same manner as in Example 1, except that 399 g of a methyltetrahydrophthalic anhydride isomer mixture (HN-2200 manufactured by Hitachi Chemical Co., Ltd.) was used as the acid component (A), 100 g of terephthalic acid (manufactured by Wako Pure Chemical Industries, Ltd.) was used as the acid component (B), 432 g of 1,4-butanediol (manufactured by Wako Pure Chemical Industries, Ltd.) was used as the diol component, 300 ppm of isopropyl titanate (manufactured by KISHIDA CHEMICAL Co., Ltd.) was used as the polymerization catalyst, and 20 ml of toluene was used. Here, the Mn was approximately 4300, the Mw was 46000, and the Tg was 3.8° C.

The obtained resin for an oxygen-absorbing adhesive was dissolved in ethyl acetate at a concentration of 20% by weight (hereinafter, this solution is referred to as Base Solution L). An oxygen-absorbing film was prepared in the same manner as in Example 1, except that no curing agent was added to this Base Solution L. The oxygen-absorbing film was then subjected to the evaluations after storage. Table 1 shows the results.

Comparative Example 3

An oxygen-absorbing film was prepared in the same manner as in Example 1, except that no curing agent was added to Base Solution H prepared in Example 15. The oxygen-absorbing film was then subjected to the evaluations after storage. Table 1 shows the results.

Comparative Example 4

An oxygen-absorbing film was prepared in the same manner as in Example 1, except that no curing agent was added to Base Solution A prepared in Example 1. The oxygen-absorbing film was then subjected to the evaluations after storage. Table 1 shows the results.

Comparative Example 5

An oxygen-absorbing film was prepared in the same manner as in Example 1, except that no curing agent was added to Base Solution B prepared in Example 4. The oxygen-absorbing film was then subjected to the evaluations after storage. Table 1 shows the results.

Comparative Example 6

An oxygen-absorbing film was prepared in the same manner as in Example 1, except that no curing agent was added to Base Solution C prepared in Example 7. The oxygen-absorbing film was then subjected to the evaluations after storage. Table 1 shows the results.

Comparative Example 7

An oxygen-absorbing film was prepared in the same manner as in Example 1, except that no curing agent was added to Base Solution G prepared in Example 13. The oxygen-absorbing film was then subjected to the evaluations after storage. Table 1 shows the results.

Comparative Example 8

An oxygen-absorbing adhesive solution was prepared by mixing Curing Agent A in an amount of 10 phr in terms of solid content with Base Solution K prepared in Comparative Example 1, followed by shaking. An oxygen-absorbing film was prepared by using the prepared adhesive solution in the same manner as in Example 1, and then subjected to the evaluations after storage. Table 1 shows the results.

Comparative Example 9

An oxygen-absorbing adhesive solution was prepared by mixing Curing Agent B in an amount of 10 phr in terms of solid content with Base Solution K prepared in Comparative Example 1, followed by shaking. An oxygen-absorbing film was prepared by using the prepared adhesive solution in the same manner as in Example 1, and then subjected to the evaluations after storage. Table 1 shows the results.

Comparative Example 10

An oxygen-absorbing adhesive solution was prepared by mixing Curing Agent A in an amount of 10 phr in terms of solid content with Base Solution L prepared in Comparative Example 2, followed by shaking. An oxygen-absorbing film was prepared by using the prepared adhesive solution in the same manner as in Example 1, and then subjected to the evaluations after storage. Table 1 shows the results.

Comparative Example 11

A resin for an oxygen-absorbing adhesive was obtained by conducting polymerization for approximately 2 hours in the same manner as in Example 1, except that 249 g of a methyltetrahydrophthalic anhydride isomer mixture (HN-2200 manufactured by Hitachi Chemical Co., Ltd.) was used as the acid component (A), 150 g of terephthalic acid (manufactured by Wako Pure Chemical Industries, Ltd.) was used as the acid component (B), 60 g of succinic anhydride (manufactured by Wako Pure Chemical Industries, Ltd.) was used as the further acid component, 459 g of 1,4-butanediol (manufactured by Wako Pure Chemical Industries, Ltd.) was used as the diol component, 300 ppm of isopropyl titanate (manufactured by KISHIDA CHEMICAL Co., Ltd.) was used as the polymerization catalyst, and 20 ml of toluene was used. Here, the Mn was approximately 5100, the Mw was 36700, and the Tg was −3.4° C.

The obtained resin for an oxygen-absorbing adhesive was dissolved in ethyl acetate at a concentration of 20% by weight (hereinafter, this solution is referred to as Base Solution M). An oxygen-absorbing adhesive solution was prepared by mixing Curing Agent A in an amount of 10 phr in terms of solid content with this Base Solution M, followed by shaking. An oxygen-absorbing film was prepared by using the prepared adhesive solution in the same manner as in Example 1, and then subjected to the evaluations after storage. Table 1 shows the results.

Comparative Example 12

A resin for an oxygen-absorbing adhesive was obtained by conducting polymerization for approximately 4 hours in the same manner as in Example 1, except that 399 g of a methyltetrahydrophthalic anhydride isomer mixture (HN-2200 manufactured by Hitachi Chemical Co., Ltd.) was used as the acid component (A), 121 g of sebacic acid (manufactured by Wako Pure Chemical Industries, Ltd.) was used as the further acid component, 351 g of 1,4-butanediol (manufactured by Wako Pure Chemical Industries, Ltd.) was used as the diol component, 300 ppm of isopropyl titanate (manufactured by KISHIDA CHEMICAL Co., Ltd.) was used as the polymerization catalyst, and 20 ml of toluene was used. Here, the Mn was approximately 3700, the Mw was 27000, and the Tg was −25.1° C.

The obtained resin for an oxygen-absorbing adhesive was dissolved in ethyl acetate at a concentration of 20% by weight (hereinafter, this solution is referred to as Base Solution N). An oxygen-absorbing adhesive solution was prepared by mixing Curing Agent B in an amount of 10 phr in terms of solid content with this Base Solution N, followed by shaking. An oxygen-absorbing film was prepared by using the prepared adhesive solution in the same manner as in Example 1, and then subjected to the evaluations after storage. Table 1 shows the results.

Comparative Example 13

A resin for an oxygen-absorbing adhesive was obtained by conducting polymerization for approximately 3 hours in the same manner as in Example 1, except that 449 g of a methyltetrahydrophthalic anhydride isomer mixture (HN-2200 manufactured by Hitachi Chemical Co., Ltd.) was used as the acid component (A), 30 g of succinic anhydride (manufactured by Wako Pure Chemical Industries, Ltd.) was used as the further acid component, 461 g of 1,6-hexanediol (manufactured by Wako Pure Chemical Industries, Ltd.) was used as the diol component, 300 ppm of isopropyl titanate (manufactured by KISHIDA CHEMICAL Co., Ltd.) was used as the polymerization catalyst, and 20 ml of toluene was used. Here, the Mn was approximately 6000, the Mw was 67000, and the Tg was −23.6° C.

The obtained resin for an oxygen-absorbing adhesive was dissolved in ethyl acetate at a concentration of 20% by weight (hereinafter, this solution is referred to as Base Solution O). An oxygen-absorbing adhesive solution was prepared by mixing Curing Agent B in an amount of 10 phr in terms of solid content with this Base Solution O, followed by shaking. An oxygen-absorbing film was prepared by using the prepared adhesive solution in the same manner as in Example 1, and then subjected to the evaluations after storage. Table 1 shows the results.

TABLE 1

| | Constitution of resin % by mole | | | | | | | |
|---|---|---|---|---|---|---|---|---|
| | | Acid component | | | | | | |
| | Acid component (A) | Acid component (B) | | Further acid component | | | Diol component | |
| | | Terephthalic acid | Isophthalic acid | Succinic acid | Adipic acid | Sebacic acid | 1,4-Butanediol | 1,6-Hexanediol |
| Example 1 | 80 | 10 | — | 10 | — | — | 100 | — |
| Example 2 | | | | | | | | |
| Example 3 | | | | | | | | |
| Example 4 | 80 | 5 | — | 15 | — | — | 100 | — |
| Example 5 | | | | | | | | |
| Example 6 | | | | | | | | |
| Example 7 | 80 | — | — | 20 | — | — | 100 | — |
| Example 8 | | | | | | | | |
| Example 9 | | | | | | | | |
| Example 10 | 80 | — | 10 | 10 | — | — | 100 | — |
| Example 11 | 80 | 10 | — | — | 10 | — | 100 | — |
| Example 12 | 90 | 5 | — | 5 | — | — | 100 | — |
| Example 13 | 90 | — | — | 10 | — | — | 100 | — |
| Example 14 | | | | | | | | |
| Example 15 | 90 | 10 | — | — | — | — | 100 | — |
| Example 16 | 70 | 15 | — | 15 | — | — | 100 | — |
| Comp. Ex. 1 | 70 | 30 | — | — | — | — | 100 | — |
| Comp. Ex. 2 | 80 | 20 | — | — | — | — | 100 | — |
| Comp. Ex. 3 | 90 | 10 | — | — | — | — | 100 | — |
| Comp. Ex. 4 | 80 | 10 | — | 10 | — | — | 100 | — |
| Comp. Ex. 5 | 80 | 5 | — | 15 | — | — | 100 | — |
| Comp. Ex. 6 | 80 | — | — | 20 | — | — | 100 | — |
| Comp. Ex. 7 | 90 | — | — | 10 | — | — | 100 | — |
| Comp. Ex. 8 | 70 | 30 | — | — | — | — | 100 | — |

TABLE 1-continued

| | | | | | | | | |
|---|---|---|---|---|---|---|---|---|
| Comp. Ex. 9 | | | | | | | | |
| Comp. Ex. 10 | 80 | 20 | — | — | — | — | 100 | — |
| Comp. Ex. 11 | 50 | 30 | — | 20 | — | — | 100 | — |
| Comp. Ex. 12 | 80 | — | — | — | — | 20 | 100 | — |
| Comp. Ex. 13 | 90 | — | — | 10 | — | — | — | 100 |

| | | Curing agent | | Oxygen-absorbing performance | | | Creep resistance | | Overall |
|---|---|---|---|---|---|---|---|---|---|
| | Tg | | Added amount | 7-day period | 14-day period | | | | |
| | °C. | Kind | phr | ml/cm2 | ml/cm2 | Evaluation | mm | Evaluation | evaluation |
| Example 1 | −2.2 | Curing Agent A | 10 | 0.025 | 0.029 | G | 0 | G | G |
| Example 2 | | | 20 | 0.022 | 0.025 | G | 0 | G | G |
| Example 3 | | Curing Agent B | 10 | 0.027 | 0.033 | G | 0 | G | G |
| Example 4 | −5.3 | Curing Agent A | 10 | 0.028 | 0.036 | G | 0 | G | G |
| Example 5 | | | 20 | 0.027 | 0.033 | G | 0 | G | G |
| Example 6 | | Curing Agent B | 10 | 0.028 | 0.035 | G | 0 | G | G |
| Example 7 | −8.5 | Curing Agent A | 10 | 0.034 | 0.038 | G | 0 | G | G |
| Example 8 | | | 20 | 0.030 | 0.034 | G | 0 | G | G |
| Example 9 | | Curing Agent B | 10 | 0.030 | 0.040 | G | 0 | G | G |
| Example 10 | −2.9 | Curing Agent A | 10 | 0.026 | 0.030 | G | 0 | G | G |
| Example 11 | −6.5 | Curing Agent A | 10 | 0.027 | 0.034 | G | 0 | G | G |
| Example 12 | −1.5 | Curing Agent A | 10 | 0.025 | 0.030 | G | 0 | G | G |
| Example 13 | −4.2 | Curing Agent A | 10 | 0.030 | 0.033 | G | 0 | G | G |
| Example 14 | | Curing Agent B | 10 | 0.031 | 0.037 | G | 0 | G | G |
| Example 15 | 0.2 | Curing Agent A | 10 | 0.023 | 0.026 | G | 0 | G | G |
| Example 16 | −3.8 | Curing Agent A | 10 | 0.024 | 0.030 | G | 0 | G | G |
| Comp. Ex. 1 | 5.7 | — | — | 0.027 | 0.032 | G | >30 | P | P |
| Comp. Ex. 2 | 3.8 | — | — | 0.018 | 0.035 | G | >30 | P | P |
| Comp. Ex. 3 | 0.2 | — | — | 0.021 | 0.044 | G | >30 | P | P |
| Comp. Ex. 4 | −2.2 | — | — | 0.016 | 0.036 | G | >30 | P | P |
| Comp. Ex. 5 | −5.3 | — | — | 0.014 | 0.032 | P | >30 | P | P |
| Comp. Ex. 6 | −8.5 | — | — | 0.002 | 0.006 | P | >30 | P | P |
| Comp. Ex. 7 | −4.2 | — | — | 0.001 | 0.003 | P | >30 | P | P |
| Comp. Ex. 8 | 5.7 | Curing Agent A | 10 | 0.012 | 0.016 | P | 0 | G | P |
| Comp. Ex. 9 | | Curing Agent B | 10 | 0.011 | 0.017 | P | 0 | G | P |
| Comp. Ex. 10 | 3.8 | Curing Agent A | 10 | 0.014 | 0.020 | P | 0 | G | P |
| Comp. Ex. 11 | −3.4 | Curing Agent A | 10 | 0.013 | 0.018 | P | 0 | G | P |
| Comp. Ex. 12 | −25.1 | Curing Agent B | 10 | 0.008 | 0.016 | P | 0 | G | P |
| Comp. Ex. 13 | −23.6 | Curing Agent B | 10 | 0.012 | 0.022 | P | 0 | G | P |

INDUSTRIAL APPLICABILITY

A flexible packaging material having excellent oxygen removal performance can be easily produced by using an oxygen-absorbing adhesive containing the resin for an oxygen-absorbing adhesive of the present invention and a curing agent blended therein as an alternative to a conventional adhesive for dry lamination. This oxygen-absorbing flexible packaging material makes it possible to keep for long periods the qualities of foods, pharmaceuticals, electronic components, and the like which are sensitive to oxygen.

The invention claimed is:

1. A two-part curable oxygen-absorbing resin composition comprising:
   (i) a main agent comprising a resin, wherein
   the resin is a polyester comprising structural units derived from an acid component (A) and an acid component (B),
   the ratio of the acid component (A) is 70% to 95% by mole relative to all acid components,
   the ratio of the acid component (B) is 0% to 15% by mole relative to the all acid components, and
   the glass transition temperature of the polyester is −20° C. to 0° C.; and
   (ii) a curing agent component selected from the group consisting of aliphatic diisocyanates, alicyclic diisocyanates, and combinations thereof, wherein:
   the acid component (A) is a tetrahydrophthalic acid, a derivative thereof, a tetrahydrophthalic anhydride, or a derivative thereof, wherein the derivative is an ester, an acid halide, a substituted compound, or an oligomer and
   the acid component (B) is a phthalic acid or an analog of the phthalic acid.

2. The two-part curable oxygen-absorbing resin composition according to claim 1, wherein the acid component (A) is a methyltetrahydrophthalic acid, a derivative thereof, a methyltetrahydrophthalic anhydride, or a derivative thereof.

3. The two-part curable oxygen-absorbing resin composition according to claim 1, wherein
   the acid component (A) contains 50% by mole or more of an acid component having a structure selected from the group consisting of (i) and (ii):
   (i) a tetrahydrophthalic acid, a derivative thereof, a tetrahydrophthalic anhydride, or a derivative thereof having a carbon atom which is bonded to both groups having the following structures (a) and (b) and also which is bonded to one or two hydrogen atoms, the carbon atom being included in an alicyclic structure:
      (a) a carbon-carbon double bond group,
      (b) an oxygen atom-containing functional group or a linking group derived from the functional group; and
   (ii) a tetrahydrophthalic acid, a derivative thereof, a tetrahydrophthalic anhydride, or a derivative thereof in which a carbon atom adjacent to a carbon-carbon double bond in an unsaturated alicyclic structure is bonded to an electron-donating substituent and a hydrogen atom, another carbon atom adjacent to the carbon atom is bonded to a hetero atom-containing functional group or a linking group derived from the functional group, and the electron-donating substituent and the hetero atom-containing functional group or the linking group derived from the functional group are in a cis configuration.

4. The two-part curable oxygen-absorbing resin composition according to claim 3, wherein the acid component having the structure of (i) is 4-methyl-$\Delta^3$-tetrahydrophthalic acid, a derivative thereof, 4-methyl-$\Delta^3$-tetrahydrophthalic anhydride, or a derivative thereof, and the acid component having the structure of (ii) is cis-3-methyl-$\Delta^4$-tetrahydrophthalic acid, a derivative thereof, cis-3-methyl-$\Delta^4$-tetrahydrophthalic anhydride, or a derivative thereof.

5. The two-part curable oxygen-absorbing resin composition according to claim 1, wherein the resin is the polyester further comprising a structural unit derived from 1,4-butanediol.

6. The two-part curable oxygen-absorbing resin composition according to claim 1, comprising a structural unit derived from an aliphatic dicarboxylic acid, which is a further acid component, in an amount of 1% to 30% by mole relative to the all acid components.

7. The two-part curable oxygen-absorbing resin composition according to claim 6, wherein the aliphatic dicarboxylic acid is succinic acid or adipic acid.

8. An oxygen-absorbing adhesive comprising the two-part curable oxygen-absorbing resin composition according to claim 1.

9. An oxygen-absorbing laminated film comprising at least:

an oxygen barrier film layer;

an oxygen-absorbing layer made of the oxygen-absorbing adhesive according to claim 1; and a sealant film layer.

* * * * *